US010373081B2

(12) United States Patent
Crawford et al.

(10) Patent No.: US 10,373,081 B2
(45) Date of Patent: Aug. 6, 2019

(54) ON-DEMAND UTILITY SERVICES UTILIZING YIELD MANAGEMENT

(75) Inventors: Catherine H. Crawford, Carmel, NY (US); Zhen Liu, Tarrytown, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1763 days.

(21) Appl. No.: 12/133,720

(22) Filed: Jun. 5, 2008

(65) Prior Publication Data

US 2008/0235703 A1 Sep. 25, 2008

Related U.S. Application Data

(63) Continuation of application No. 10/987,748, filed on Nov. 12, 2004, now abandoned.

(51) Int. Cl.

| | |
|---|---|
| ***G06Q 10/02*** | (2012.01) |
| ***G06Q 10/06*** | (2012.01) |
| ***G06Q 10/04*** | (2012.01) |
| ***G06Q 10/10*** | (2012.01) |
| ***G06Q 30/02*** | (2012.01) |

(52) U.S. Cl.

CPC ............ *G06Q 10/04* (2013.01); *G06Q 10/02* (2013.01); *G06Q 10/06* (2013.01); *G06Q 10/0631* (2013.01); *G06Q 10/06312* (2013.01); *G06Q 10/06315* (2013.01); *G06Q 10/10* (2013.01); *G06Q 30/02* (2013.01)

(58) Field of Classification Search

CPC ......... G06Q 10/0631; G06Q 10/06315; G06Q 10/06312

USPC ........................................................ 405/7.12

See application file for complete search history.

(56) References Cited

U.S. PATENT DOCUMENTS

| | | | | |
|---|---|---|---|---|
| 5,255,184 A | | 10/1993 | Hornick et al. | |
| 5,270,921 A | | 12/1993 | Hornick | |
| 5,640,569 A | * | 6/1997 | Miller et al. | 710/241 |
| 6,009,407 A | | 12/1999 | Garg | |
| 6,085,164 A | | 7/2000 | Smith et al. | |
| 6,085,169 A | * | 7/2000 | Walker et al. | 705/26 |
| 6,101,484 A | | 8/2000 | Halbert et al. | |

(Continued)

OTHER PUBLICATIONS

U.S. Appl. No. 10/718,210, filed Nov. 20, 2003, P. Dube et al.

(Continued)

*Primary Examiner* — Johnna R Loftis

(74) *Attorney, Agent, or Firm* — Daniel P. Morris; Ryan, Mason & Lewis, LLP

(57) ABSTRACT

Techniques for provision of on-demand utility services utilizing a yield management framework are disclosed. For example, in one illustrative aspect of the invention, a system for managing one or more computing resources associated with a computing center comprises: (i) a resource management subsystem for managing the one or more computing resources associated with the computing center, wherein the computing center is able to provide one or more computing services in response to one or more customer demands; and (ii) a yield management subsystem coupled to the resource management subsystem, wherein the yield management subsystem optimizes provision of the one or more computing services in accordance with the resource management subsystem and the one or more computing resources.

18 Claims, 5 Drawing Sheets

(56) References Cited

U.S. PATENT DOCUMENTS

| | | | | |
|---|---|---|---|---|
| 6,263,315 | B1 | 7/2001 | Talluri | |
| 6,526,392 | B1 * | 2/2003 | Dietrich et al. | 705/400 |
| 6,526,935 | B2 | 3/2003 | Shaw | |
| 6,567,824 | B2 | 5/2003 | Fox | |
| 6,601,083 | B1 | 7/2003 | Reznak | |
| 6,671,673 | B1 | 12/2003 | Baseman et al. | |
| 6,952,688 | B1 * | 10/2005 | Goldman et al. | 706/45 |
| 6,968,323 | B1 * | 11/2005 | Bansal | G06Q 10/06 370/230 |
| 7,941,427 | B2 * | 5/2011 | Barsness | G06F 9/505 705/500 |
| 2001/0025310 | A1 * | 9/2001 | Krishnamurthy | G06Q 10/06395 709/223 |
| 2002/0055865 | A1 | 5/2002 | Hammann | |
| 2002/0065699 | A1 | 5/2002 | Talluri | |
| 2002/0120492 | A1 | 8/2002 | Phillips et al. | |
| 2003/0088457 | A1 | 5/2003 | Keil et al. | |
| 2003/0126202 | A1 | 7/2003 | Watt | |
| 2004/0136394 | A1 * | 7/2004 | Onno et al. | 370/438 |
| 2004/0249658 | A1 * | 12/2004 | Schwerin-Wenzel et al. | 705/1 |
| 2004/0249699 | A1 | 12/2004 | Laurent et al. | |
| 2005/0114274 | A1 * | 5/2005 | Dube | G06Q 30/0283 705/400 |

OTHER PUBLICATIONS

U.S. Appl. No. 10/316,251, filed Dec. 10, 2002, Eilam et al.
U.S. Appl. No. 09/832,438, filed Apr. 10, 2001, Liu et al.
U.S. Appl. No. 09/559,065, filed Apr. 28, 2000, Goldszmidt et al.
U.S. Appl. No. 09/543,207, filed Apr. 5, 2000.
Search Report for TW 093134925.
A. Byde et al., "Market-Based Resource Allocation for Utility Data Centers,"Hewlett Packard Tech Report, Sep. 2003, pp. 1-15.
X. Zhu et al., "Optimal Resource Assignment in Internet Data Centers," IEEE Proceedings of the Ninth International Symposium on Modeling, Analysis, and Simulation of Computer and Telecommunications Systems, Aug. 2001, pp. 61-69, Cincinnati, Ohio, USA.

* cited by examiner (1) - INSTALL (2) - ADD NOTE (3) - DELETE NOTE

ON-DEMAND UTILITY SERVICES UTILIZING YIELD MANAGEMENT

CROSS-REFERENCE TO RELATED APPLICATION(S)

This application is a continuation of pending U.S. application Ser. No. 10/987,748 filed on Nov. 12, 2004, the disclosure of which is incorporated herein by reference.

FIELD OF THE INVENTION

The present invention relates to techniques for provision of on-demand utility services and, more particularly, to techniques for provision of on-demand utility services utilizing a yield management framework.

BACKGROUND OF THE INVENTION

It is known that a group of computing resources that perform one or more related functions may be referred to as a "computing center." Typically, a computing center may be composed of a number of processor resources (e.g., servers), disk storage, applications, software tools, and internal communication links between the various devices and with the external clients. Clients send their jobs to the system through an external network and jobs are queued and processed through the system. Results may be received by clients during the process or only at the end of the process. Computing centers may take on a number of forms such as, for example, web server farms, scientific computing centers, or on-demand facilities for general computing use.

It would be desirable for resource management systems associated with such computing centers to take into account the varying requirements of different customers (clients), and the different levels of service that were promised to each client.

Currently, resource management in computing centers attempts to satisfy constraints associated with the computing needs of the current clients of the system. However, no existing resource management system associated with such computing centers incorporates yield management techniques. In particular, there is no such system that considers global objectives and makes use of a possibly high degree of price and demand segmentation to achieve those objectives and links them with the operation (e.g., resource allocation, scheduling, monitoring) of the computing center.

Thus, a need exists for improved resource management techniques associated with computing centers.

SUMMARY OF THE INVENTION

The present invention provides techniques for provision of on-demand utility services utilizing a yield management framework.

For example, in one illustrative aspect of the invention, a system for managing one or more computing resources associated with a computing center comprises: (i) a resource management subsystem for managing the one or more computing resources associated with the computing center, wherein the computing center is able to provide one or more computing services in response to one or more customer demands; and (ii) a yield management subsystem coupled to the resource management subsystem, wherein the yield management subsystem optimizes provision of the one or more computing services in accordance with the resource management subsystem and the one or more computing resources.

The yield management subsystem comprises a yield management reservation subsystem which determines one or more optimized price/service-level combinations associated with provision of the one or more computing services. Further, the yield management subsystem comprises a yield management scheduler which determines one or more schedules for providing the one or more computing services in accordance with the one or more optimized price/service-level combinations. Also, the yield management subsystem comprises a yield management monitor which tracks one or more service level agreements and a degree of satisfaction thereof, and which compiles aggregate statistics for use by the a yield management reservation subsystem. Still further, the yield management subsystem comprises one or more yield management marketing strategy templates which provide one or more yield management-based marketing strategies for use by the a yield management reservation subsystem.

The yield management subsystem may further comprise a service level agreement advisor which adds one or more customer-specific service requirements to the scheduling of a workload of a customer on a virtual cluster allocated to that customer. The one or more computing services may comprise one or more on-demand utility services. The yield management reservation subsystem may be further operative to offer more than one price for the same service level, where prices are offered in limited quantities, and the quantities are optimized depending on resource levels and demand models. The yield management reservation subsystem may be future operative to suggest varying the quantities to be made available at each price and service level over a given period of time so as to effect usage patterns. The resource management system may comprise one or more of a subscription module, a billing module, a service level agreement definition module, and a provisioning module.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
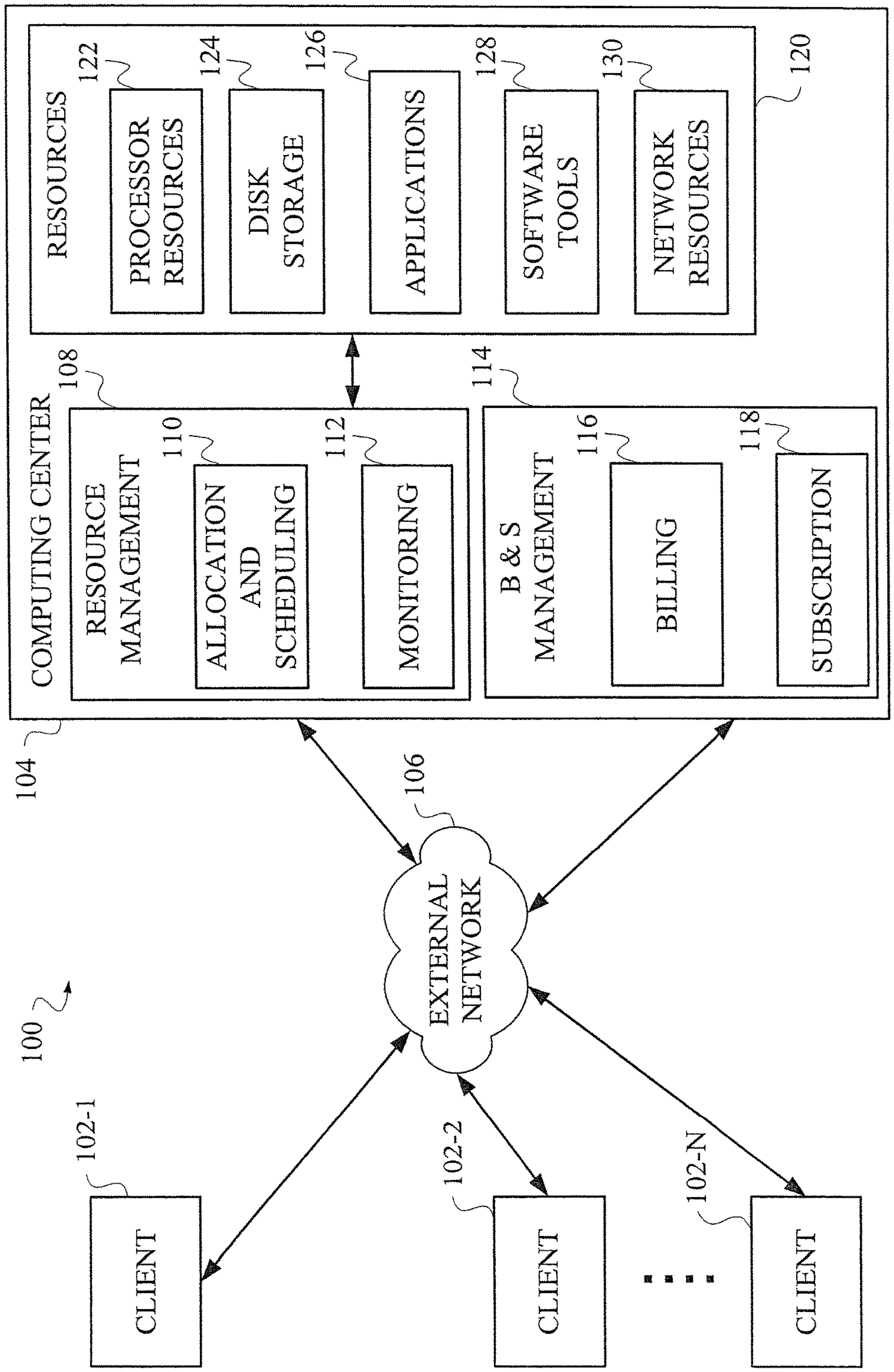
FIG. 1 is a block diagram illustrating a computing center environment with which techniques of the present invention may be implemented.

The present invention provides techniques that allow a yield management system to link to an existing resource management system associated with a computing center. While illustrative embodiments will be described in the context of an on-demand utility computing center, it is to be understood that the principles of the invention are not limited to such computing environments but are more generally applicable to any type of computing environments in which yield management techniques may be useful.

Before providing detailed descriptions of the inventive techniques, some terms used herein will be generally defined.

A "demand," as generally used in accordance with the invention, refers to an estimate of the likely number of users or requests to the system, and generally depends upon the characteristics of the system. For example, the better the system, the higher the demand.

A "price" is a characteristic of the system that, as generally used in accordance with the invention, refers to the cost paid by a user of the system for the use or request in question.

A "service-level" is also a characteristic of the system that, as generally used in accordance with the invention, refers to non-monetary attributes of the service provided, e.g., processing time, reliability, guarantee of access, etc.

A "product," as generally used in accordance with the invention, refers to a price-service-level pair or combination. For example, use of capacity in a hosting facility may be offered at a certain price and with a particular guarantee of access. Then, the same capacity at a different price and/or with a different guarantee of access is a different product.

An "on-demand utility service," as generally used in accordance with the invention, refers to information technology (IT) services which allow businesses to access IT infrastructures, software applications and business processes over the network when, and only if, they need them. A further characteristic of an "on-demand utility service" is that it converts IT from a fixed to a variable cost.

Thus, in accordance with principles of the invention, techniques defining how an on-demand utility service can be operated with a yield management system are provided.

As will be illustratively explained in detail herein, the present invention provides techniques for the implementation and use of yield management-based utility services. In general, an illustrative system embodying the yield management-based methodology includes a yield management reservation system, a yield management scheduler and arbitrator, a service level agreement advisor, a yield management monitoring system and statistics generator, yield management marketing strategies templates, and customer-facing modules such as subscription and billing services.

The yield management components are based on a fine segmentation of customer demand using data on price/service-level elasticities (also known as price/service-level sensitivity, elastic demand curves, etc.) that relate levels of demand to price and service levels offered to the clients and link these demand-side characteristics with the supply-side through a yield management scheduler and arbitrator and the yield management reservation system. Thus, an on-demand utility computing center of the invention may be characterized by a yield management reservation system that offers more than one price for the same service level, where prices are offered in limited quantities, and the quantities are optimized depending on resource levels and demand models.

Accordingly, the invention provides methodologies for linking a yield management reservation system with resource allocation systems for computing centers and for converting an existing platform to a yield management-driven system.

Referring initially to FIG. 1, a block diagram illustrates a typical computing center environment with which techniques of the present invention may be implemented. As shown, computing center environment 100 comprises: a plurality of clients 102-1, 102-2, . . . 102-N and a computing center 104 coupled via an external network 106. By way of example only, external network 106 may be the Internet or World Wide Web.

Computing center 104 itself comprises a resource management subsystem 108 comprising an allocation and scheduling module 110 and a monitoring module 112. Computing center 104 also comprises a billing and subscription subsystem 114 comprising a billing module 116 and a subscription module 118. Computing center 104 also comprises resources 120 such as processor resource(s) 122 (e.g., one or more central processing units (CPUs), one or more servers, etc.), disk storage 124, application(s) 126, software tool(s) 128, and internal network resource(s) 130.

Internal network resource(s) 130 may, by way of example only, comprise communication links between the various components and with the external clients, and may also comprise the actual bandwidth of the internal network that connects the various resources of the computing center. Further, by way of example only, applications 126 may comprise database programs, office or management software, scientific applications, etc.; while software tools 128 may comprise software that enables other applications and services on the system, middleware, etc.

Allocation and scheduling module 110 generally serves to assign proportions of processing and memory resources to each service class. It is to be understood that a computing center may typically recognize one or more service classes (i.e., respective grouping of clients based on a particular service requested and/or a priority requested). Allocation and scheduling module 110 may also set a queuing discipline to state how to handle the transactions in each service class (for example, first-in-first out, etc.).

It is to be understood that monitoring in conventional computing centers is performed on the service class basis (or even on the entire-system level) to determine performance (e.g., response time). That is, in conventional computing center environments, there is no tracking (monitoring) on the transaction-level which would be needed to do billing at that level. So, conventional monitoring tracks system or service-class performance. It will be seen that the present invention provides techniques for tracking or monitoring on the transaction-level.

Billing module 116 generally handles generation and processing of bills associated with services provided by the computing center to the clients. Subscription module 118 generally handles issues relating to a user's subscribing to the services of the computing center.

In general, clients 102-1, 102-2, . . . , 102-N send their jobs (more generally, requests) to computing center 104 through external network 106 and jobs are queued and processed through computing center 104. Results generated by computing center 104 may be received by clients during the process or only at the end of the process. While the invention is not limited to any particular form of a computing center, computing center 104 may represent a web server farm, a scientific computing center, and/or an on-demand facility for general computing use.

As mentioned above, the present invention provides techniques that allow a yield management system to link to an existing resource management system associated with a computing center such as a computing center which provides on-demand utility services. The system components may include the subscription and billing services that interact with customers, the resource allocation and scheduling components that link customer requests to the computing center hardware, software, and network infrastructure, and the monitoring tools that evaluate the throughput and response times of each job, and keep track of those parameters and possibly others with respect to service-level promises.

In order to implement a yield management reservation system for utility computing centers, a yield management reservation system needs to be integrated with existing management systems. In accordance with the present invention, this may be accomplished using additional yield-management-based modules such as a yield management scheduler and arbitrator, or broker, that offers to a traditional scheduler the local decisions that if applied would optimize the yield management objective.

That is, the yield-management scheduler determines in what order to process jobs that best satisfy the promises made by the yield management reservation system, from the point of view of current and predicted future demands, and therefore current and possible future profits/benefit. Similarly, a yield management monitoring tool may be used to compile and report the statistics needed by yield management prediction and assignment functions. Other components may include tools for integrating marketing strategies into the reservation system, demand and resource level prediction functions, and modules for billing, subscription, and contract (e.g., service level agreement or SLA) definition.

An embodiment of a yield management-based computing center, according to an illustrative embodiment of the present invention, will now be described.

Figure 2:
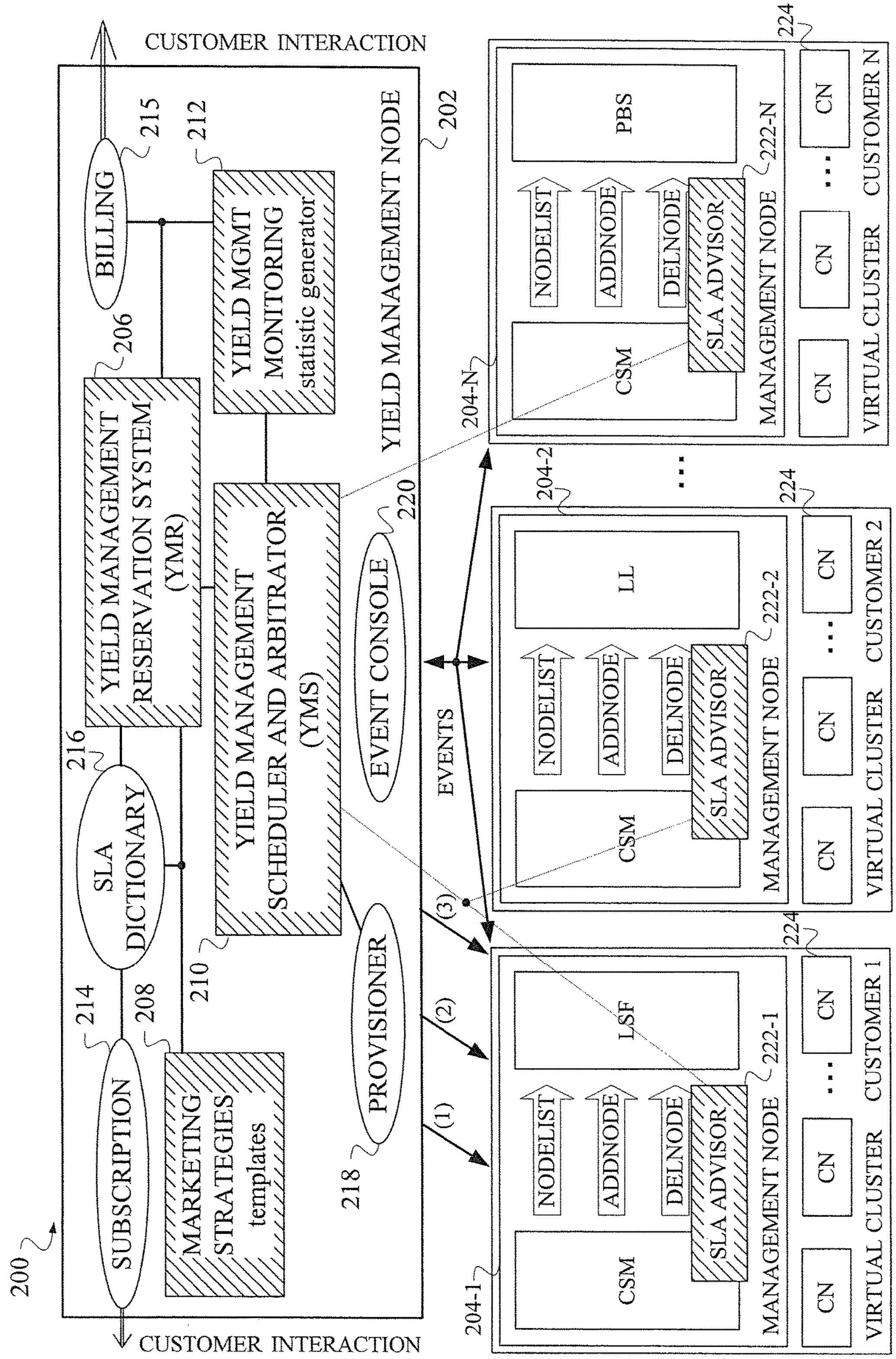
FIG. 2 is a block diagram illustrating an implementation of a yield management system within a computing center architecture, according to an embodiment of the invention.

Referring now to FIG. 2, a block diagram illustrates an implementation of a yield management system within a typical computing center architecture (e.g., the computing system architecture of FIG. 1).

It is to be appreciated that the functional components that are added to the existing computing center architecture are illustratively depicted in FIG. 1 as hatched line boxes. However, it is to be understood that the invention is not limited to any particular implementation.

As shown, a computing center environment 200 comprises a yield management node 202. Yield management node 202 itself comprises a yield management reservation system (YMR) 206, marketing strategies templates 208, a yield management scheduler and arbitrator (YMS) 210, a yield management monitoring statistics generator 212, a subscription module 214, a billing module 215, an SLA dictionary 216, a provisioner 218, an event console 220, and SLA advisors 222-1 through 222-N (shown functionally connected to YMS 210 via dotted lines).

Further, computing center environment 200 comprises customer management nodes 204-1 through 204-N. It is to be appreciated that each customer management node 204 functionally corresponds to a client (e.g., 102-1 through 102-N of FIG. 1). That is, each management node represents clusters of servers managed by a scheduler and load balancer. Thus, each management node functionally represents the computing center resources (e.g., shown as compute nodes or CNs) that are being used to service the request of the given client, and the computing center resource management functions that are being used to manage the resources. For example, a management node may be shown to include a cluster systems management module (CSM), and depending on the management function being performed at the time, a platform load scheduling system (LSF), a load leveler (LL), or a portable batch system (PBS). As is known, CSM is a technology which performs remote monitoring, control and events on a managed distributed cluster. PBS, LSF, and LL are batch scheduling systems for parallel and serial jobs.

The functions "Node list," "Add node," and "Del[ete] node," shown in each customer management node are typical operations of existing schedulers/load balancers. The SLA Advisor 222 translates information on priorities and desired actions from the yield management system to those lower-level operations understood by the schedulers/load balancers.

The different clusters may be physical clusters or virtual clusters running different applications/jobs for different customers. Each customer or application is therefore associated with a service level agreement that stipulates the qualities desired of the resource and the prices and penalties to be paid/received, respectively, by the customer, depending upon the quality provided by the computing center.

Existing systems (e.g., computing centers without the hatched line boxes) operate as follows. The scheduling and resource allocation disciplines follow a pre-determined priority, independent of the external demand (present or predicted), and independent of the different resource availability levels. For example, in such existing systems, tasks are ordered as first-come, first-served.

Advantageously, the various yield management modules of the invention permit collecting, analyzing, and utilizing both external, customer demand data and resource availability information to adjust, dynamically, the priorities assigned to different jobs or customers on the system.

In particular, yield management monitoring statistics generator 212 gathers data on the current state of the system to provide current and predicted levels of these parameters. Resource levels are updated automatically by determining the available capacities as a function of the jobs currently on the system. In addition, the monitoring tool determines the values of the actual service quality (e.g., delays, throughput achieved, etc.) that the jobs in the system receive.

Figure 5:
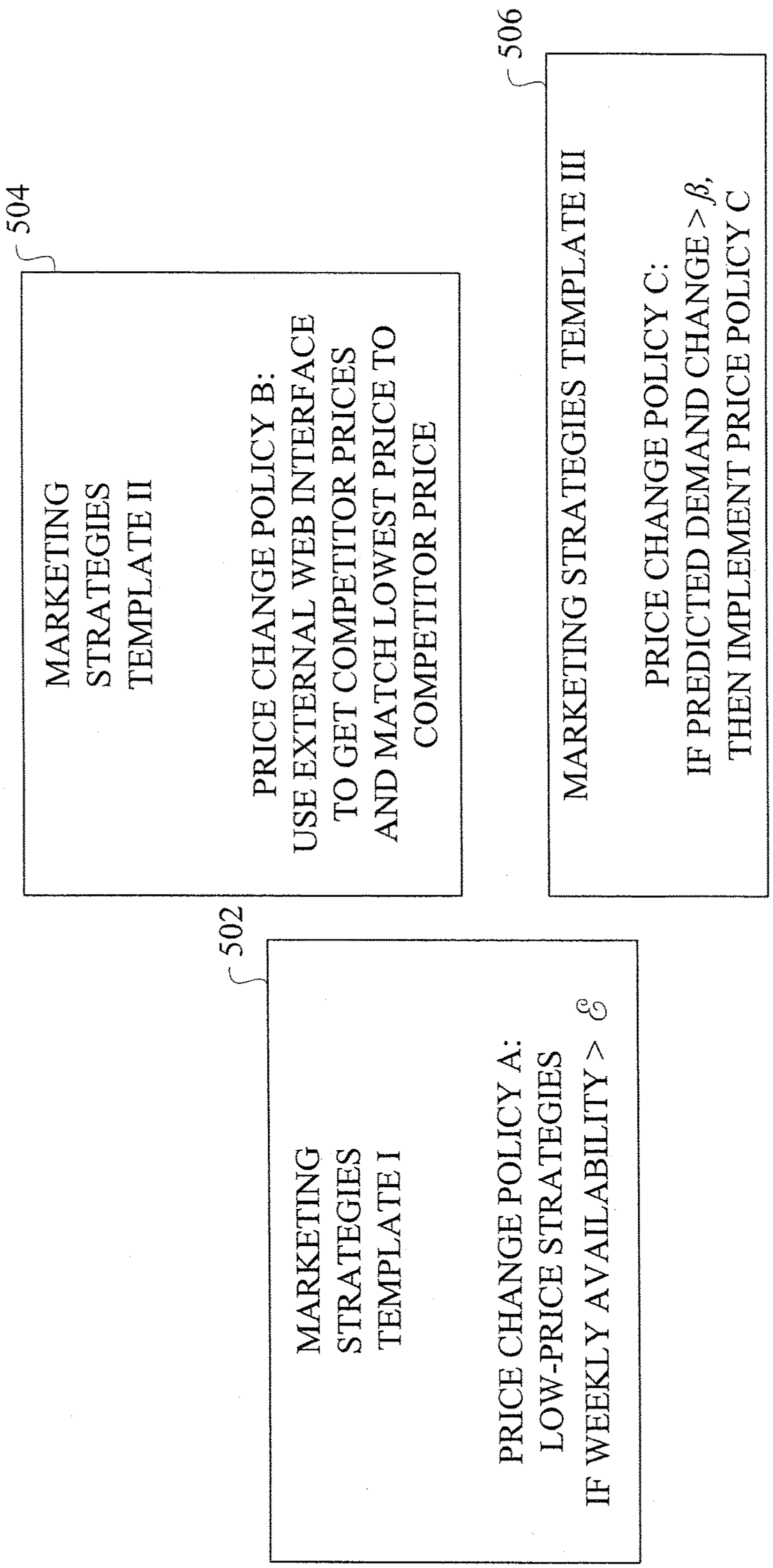
FIG. 5 is a diagram illustrating marketing strategy templates, according to embodiments of the present invention.

Yield management marketing strategies templates 208 provide input to yield management reservation system 206 as to when to introduce changes into the pricing or offerings. A second function of the templates module is the collection of external demand (usage) data. Demand data can be updated by re-calibrating a demand model based on the latest historical information, as well as new data that is provided to the system. FIG. 5 illustrates marketing strategy templates that implement various price change policies A (502), B (504), and C (506).

As an example, consider that a competitor proposes a promotional, low price for a particular offering type. When this information is provided to the marketing strategies module, an event is triggered. That module then tells the reservation system to recalculate the offerings available at each price point, adding the competitor's lower price point into the palette of possible prices. In accordance with the yield management theory and framework, an optimal, and limited, number of slots would be opened at this lower price point.

Similarly, consider an example in which the resource level during the weekend is deemed low, from statistics collected by the yield management statistics generator 212. This may trigger a different event from the marketing strategies template 208, in which lower price points are introduces for weekend days, and once again, yield management reservation system 206 is re-executed to determine the new set of offerings and prices.

One illustrative embodiment of a theory and approach that yield management reservation system 206 may implement includes the techniques disclosed in the U.S. patent application identified as Ser. No. 10/718,210 filed on Nov. 20, 2003 and entitled "Methods and Apparatus for Managing Computing Resources Based on Yield Management Framework," the disclosure of which is incorporated by reference herein. Such a reservation system can be shown to increase revenue as the number of optimal price points are increased. It does so by opening only a limited number of slots at each price point, where that number is computed optimally by a mathematical program. A more detailed explanation of the yield management theory and approach associated with the above-referenced Ser. No. 10/718,210 is provided below (in a section entitled "Illustrative Yield Management Theory and Approach"). It is to be understood, however, that the invention is not limited to this theory and approach and thus other yield management reservation techniques may be employed in accordance with the present invention.

Yield management scheduler and arbitrator 210 translates, into a set of fixed priorities for each time period, the resource level that should be allocated to each job, in accordance with the service class and price points/offering type at which that job subscribed to the system. This module works with an SLA advisor 222 to make use of the particular protocols that the scheduler and load balances require.

SLA dictionary 216 is a hashmap of SLA terms and customers, as well as the SLA objectives and their technical specifications.

Provisioner 218 executes workflows to build systems, which may include a linux box, cluster of linux boxes, or a tiered network, and where the term "build" refers to initializing all features necessary to begin operation on the system.

Event console 220 is a remote client on which system events can be published, where system events include any information on hardware, software, network or I/O that is to be monitored (e.g., outages, starts and stops, utilization levels).

Figure 3:
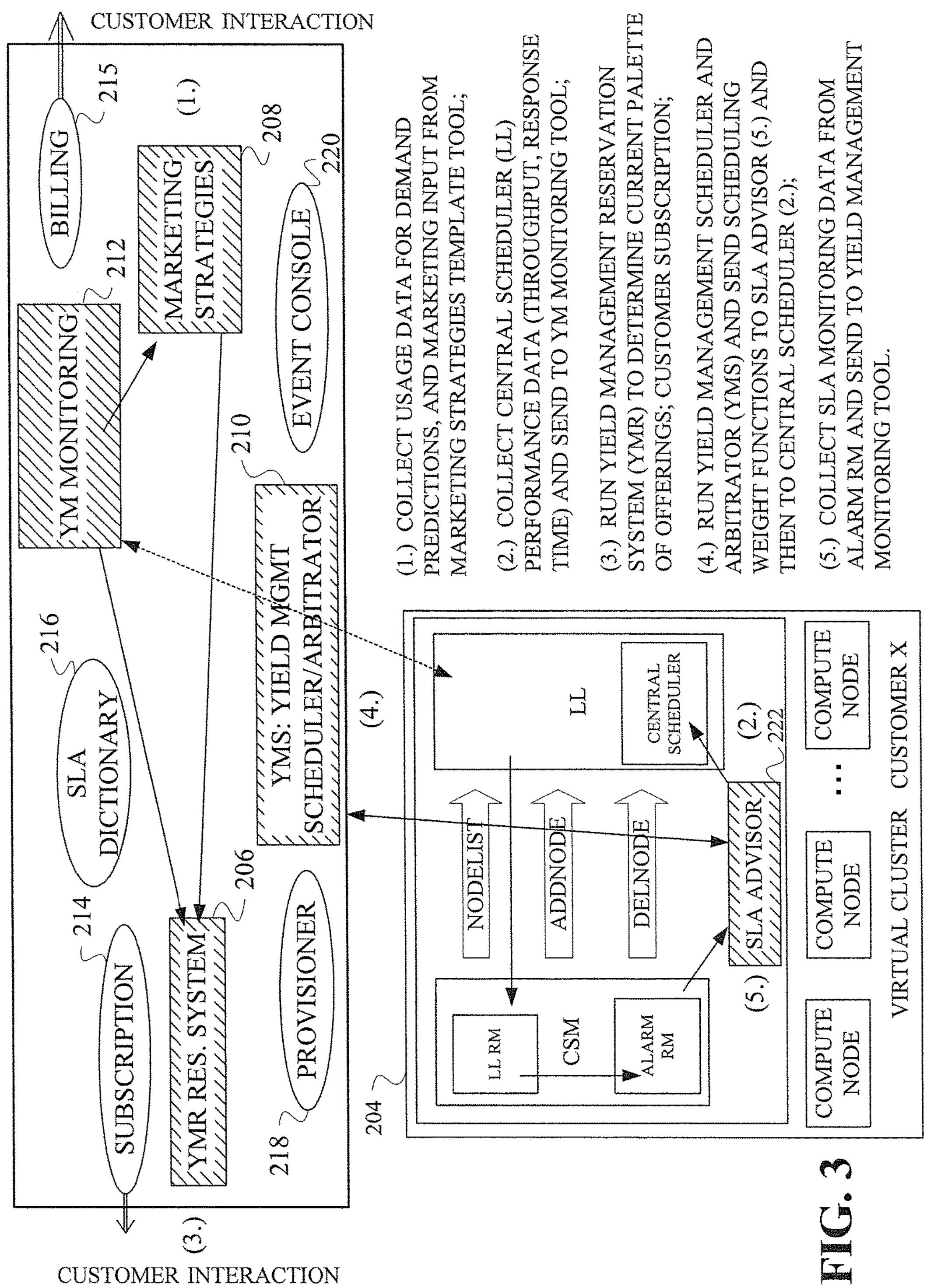
FIG. 3 is a diagram illustrating a yield management-based methodology for use in accordance with a computing center architecture, according to an embodiment of the invention.

Turning now to FIG. 3, a step-by-step example of the use of a yield management system is now provided, within a configuration such as that shown in FIG. 2.

The first step, denoted as (1), which my be an initialization of the system, or the first step at standard check-points, is to collect data on user demand, and to determine which marketing strategy should be in place. This fixes the range of possible price points to use on the optimization program. Then, step (2) involves collecting usage data on the resource, and the available level of capacity on the system, current and predicted. This also is an input into the optimization program.

Step (3) involves running the yield management optimization program on the collected and predicted data, described above. The output of this program is the optimal number of slots of each available type to offer to customers/jobs at each price point. At this point, the system is ready to receive customer subscriptions. Once there are subscriptions to these offerings, step (4) involves the yield management scheduling and arbitration tool informing the primary scheduler as to the priorities to assign to each of the jobs (existing and new) in the system. This data can be sent to the SLA advisor, if there is one, or directly to a central scheduler and load balancer.

As shown in FIG. 3, the exemplary customer management node 204 may include a Load Leveler Resource Manager (LL RM), an ALARM Resource Manager (ALARM RM), and a Central Scheduler. The LL RM is an agent process responsible for monitoring LL performance data as well as configuring LL resource pools as instructed by a human or other agents in the system, e.g., ALARM RM. ALARM RM is an agent process responsible for monitoring and setting events for resources based upon an SLA. The Central Scheduler is a component within the LL system responsible for optimally placing batch jobs on a remote system. The Central Scheduler is configured to understand the available resources in a cluster. An SLA advisor can reconfigure available rescues based upon SLA events and predictions.

The last step, denoted as (5), illustrates how the yield management monitoring tool keeps track of the parameters that are part of each job's offering, so as to re-optimize priorities at the next time step, for both the current jobs now in the system and new jobs that will join.

Figure 4:
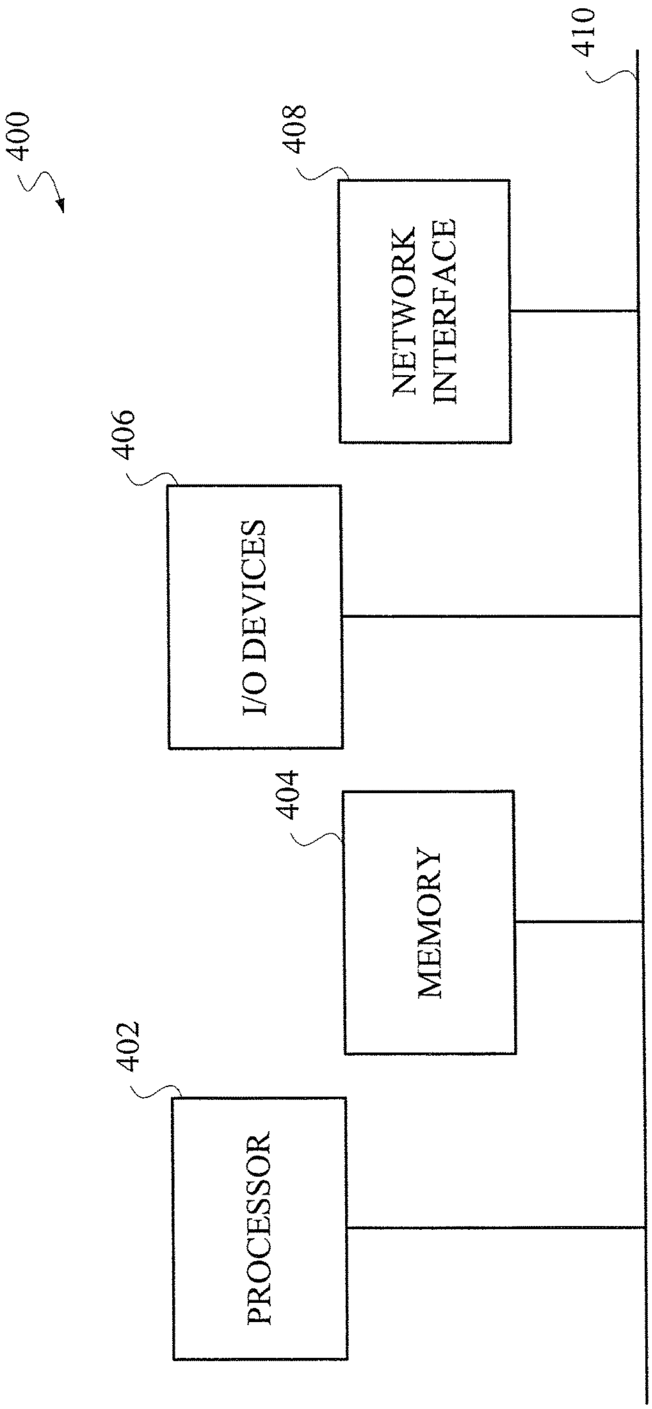
FIG. 4 is a block diagram illustrating a generalized hardware architecture of at least a portion of a computer system suitable for implementing a yield management-based computing center, according to an embodiment of the present invention.

Referring lastly to FIG. 4, a block diagram illustrates a generalized hardware architecture of at least a portion of a computer system suitable for implementing a yield management-based computing center according to an embodiment of the present invention. More particularly, FIG. 4 depicts an illustrative hardware implementation of at least a portion of a computer system in accordance with which one or more components/steps of a yield management node and customer management nodes (e.g., components/steps described in the context of FIGS. 1 through 3) may be implemented, according to an embodiment of the present invention. The illustrative architecture of FIG. 4 may also be used in implementing any and all of the resource components of computing center 104 (e.g., servers, etc.) and any and all of the computing systems associated with clients 102 (FIG. 1).

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 400 may be implemented in accordance with a processor 402, a memory 404, I/O devices 406, and a network interface 408, coupled via a computer bus 410 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Advantageously, as illustratively explained herein, the present invention provides apparatus and methodologies for implementation and use of yield management in on-demand utility services. The yield management system makes use of a fine segmentation of customer demand, and defines optimal quantities to offer at multiple price levels, so as to maximize profits or revenues. An illustrative implementation may comprise: (i) a yield management reservation system (YMR), which includes a demand forecasting module and determines the number of slots to propose at each price/service-level combination, based on a maximization of expected profits; (ii) a yield management scheduler and arbitrator (YMS), which ties into the SLA Advisor or directly to an existing (e.g., non-priority-based) scheduler and satisfies the promises of the YMR offerings or, in the presence of conflict, arbitrates with a view toward greatest profit maximization; (iii) an SLA Advisor, which, if needed, adds customer-specific service-requirements to the scheduling of a customer's workload on a virtual cluster allocated to that customer, and sends these requirements to an existing (e.g., non-priority-based) scheduler; (iv) a yield management monitoring system and statistics generator, which keeps track of service-level agreements and the degree of satisfaction of each, and compiles aggregate statistics needed by the YMR and billing services; and (v) a yield management marketing strategies template module, which proposes a palette of yield management-based marketing strategies and allows them to be incorporated optimally into the YMR, and which allows user-generated strategies to be defined as well.

These components may be integrated internally, and ideally linked to demand and resource-level prediction modules, as well as marketing input to define offerings of interest, and subscription, billing, and contract definition modules.

Thus, the invention provides for the integration of a yield management reservation system, or optimization program, within an IT utility. The different components needed for the operation of the system are described, as they fit into existing componentry in present-day IT clusters. The heart of the yield management system is an optimization framework that combines user data with resource information and determines highly segmented, optimal offerings/price points to provide to potential subscribers that maximize IT provider revenue, and allows the provider to respond optimally to competitors' offerings or accomplish other management objectives such as smoothing usage to less-used periods.

For instance, a yield management reservation subsystem of the invention may be operative to suggest varying the quantities to be made available at each price and service level over a given period of time so as to effect usage patterns. Thus, it would be possible to smooth usage patterns for the on-demand utility service by inducing users to shift to under-utilized periods of time during the given period.

To integrate the optimization program into an existing IT system, it is necessary to link it to the subscription engine as well as to the functional modules of the IT system. Such linking components are described herein, as are the ways in which the overall yield management system can be used to increase provider revenue and accomplish management goals.

It is to be further appreciated that the present invention also comprises techniques for providing computing resource management services.

By way of example, a service provider agrees (e.g., via a service level agreement or some informal agreement or arrangement) with a service customer or client to provide computing resource management services. That is, by way of one example only, the service provider may host the customer's web site and associated applications (e.g., e-commerce applications). Then, in accordance with terms of the contract between the service provider and the service customer, the service provider provides yield management services which may comprise one or more of the methodologies of the invention described herein. By way of example, this may also include automatically controlling one or more resources so as to optimize performance of such resources to the benefit of the service customer.

Illustrative Yield Management Theory and Approach

The following is a description of an illustrative yield management theory and approach that the present invention may implement. Such a yield management theory and approach is further described in the above-referenced Ser. No. 10/718,210 patent application. However, it is to be appreciated that the invention is not limited to this particular implementation.

A. Determining a Segmentation/Description of the Demand Based on Demand-Side Data:

This step involves obtaining a representation of the demand for the use of the computing center. The demand can be defined in a number of ways, such as an explicit analytical function of demand for the "product" (price-service-level) as a function of both the price and service-level. The forms of such functions are well understood in the general marketing and economics literature, and should have basic properties such as demand decreasing in price at a given service quality level, and demand increasing with increasing service quality. The precise shape of these curves can be estimated from historical data (calibrated) and demand predictions can then be made by forecasting increases or decreases in the data that served to calibrate the curve, and recalibrating.

A different method for describing demand for the computing center is known as discrete choice modeling, and involves using so-called preference functions that give the percentage of the total user population that is likely to choose among the (discrete set of) possibilities. In this case, the set of possibilities are the price-service-level offerings (that have been referred to herein as "products"). The percentage of the demand for each choice is given by a stochastic model that incorporates "perception error" into the choices. The principal models in use today are based upon either the Weibull distribution, giving rise to the "logit discrete choice model," or the Gaussian distribution of perception error, giving rise to the "probit discrete choice model," see, e.g., M. Ben-Akiva et al., "Discrete Choice Analysis: Theory and Application to Travel Demand," MIT Press, 1985.

Like the demand curve described above, these discrete choice models can be calibrated in a straightforward manner based upon historical data about the choices made in the past and the parameters of the offerings of those choices (e.g., their prices, qualities, market conditions, etc.). Similarly, forecasts can be made by projecting new values for the input data and re-deriving a forecasted logit model.

B. Aggregating the Current and Predicted Usage Levels of the Resources:

The current and future (predicted) resource levels should be quantified for the methodology to provide a set of optimal future actions and offering characteristics. In the simplest setting, this may be the capacity level of each piece of equipment. For example, the load level on machines (e.g., processing resources) 1-5 of type X may be 70%, the load level of machine 6 of type Y may be 85%, the bandwidth used between equipment Y and Z may be 50%, etc.

In addition to instantaneous usage levels, the usage levels for the rest of the planning period should also be known. This includes the fact that the jobs which are currently using, for example, machines 1-5 will finish if left uninterrupted in T1 hours, while that on machine 6 if uninterrupted will finish in T2 hours, etc. It also includes reservations made for future time periods. Finally, it can include forecasts of future loads.

This data is aggregated into the form of capacity levels per equipment type per time period, where time is divided into periods according to the minimum and maximum durations of jobs into the system.

C. Setting Levels of Prices and Services to Potentially be Offered to Clients Based on the Current and Predicted Demand and Resource Data, as Well as a Maximum Number of Different "Products" (Price-Service-Level Combinations) to Offer:

The third initialization step is to set the reasonable range of price levels for the service offerings, which are defined by the types of equipment available, for example, their processing speeds, etc. In addition, a maximum number of price classes for each service quality type can be determined in advance.

In addition to the number of price-service quality types to offer, the range of reasonable prices should be input. For example, for a unit time slice on a computing center facility, the minimum price may be $1 (per minute, hour, etc.). This type of data should be input into the model at the outset.

Finally, if there is a maximum price obtained by examining competitors or by making a reasonable guess, then this too can be input at this initialization phase.

D. Evaluating the Total Revenue for Each Combination Offered of Those Price and Service-Levels Available to Clients:

With the data from steps A, B and C input into the model, it is possible to evaluate, through an optimization program, the total revenue (or other measure) associated with each configuration of the parameter, namely the prices, quantities to offer at each price and similarly for each service-level, for each point in time during the planning period.

Based on evaluations of the revenue objective at each configuration, by running an optimization program to convergence, an optimal solution and set of parameters may be obtained.

E. Determining the Optimal Configuration in Terms of Prices, Service-Levels, and Quantities to be Offered to Clients that Maximizes the Expected Revenue of the System:

The optimal solution can be obtained by using a nonlinear programming solver on the resulting mathematical model, one exemplary implementation of which is provided below. Many such solvers are commercially available; others are distributed freely available. Applicable algorithms for constrained nonlinear programming may be found in numerous textbooks, for example, in D. P. Bertsekas, "Nonlinear Programming," 2nd ed. Cambridge, Mass.: Athena Scientific, 1999.

Further, the solver may preferably be part of the computer system implementing the yield management techniques. Alternatively, the computer system implementing the yield management techniques may call a solver located on a host machine or remotely from the computer system.

In simple versions, a linear programming solver may be used. One of the most widely used linear programming algorithms is the simplex method. A description may be found in numerous textbooks, for example, in S. G. Nash et al., "Linear and Nonlinear Programming," McGraw-Hill, 1996. For example, such a solver may be employed if the random quantities are expressed in terms of their expected (mean) values, and functional relationships for job sojourn time are externally given. In more complex cases, however, a nonlinear programming solver algorithm may be employed.

The output of the mathematical model would then be the set of prices to offer, and quantities available at each price for each service-quality type. For example, the output may be the number of CPU (central processing unit) units to offer on the machine of speed S1 at price P1, to offer at time T1, T2, etc., and the same for the other optimal price levels at each machine speed.

Given the above detailed description of a yield management methodology, we now turn to a description of techniques for using the methodology to perform additional objectives such as increasing market share (e.g., through promotions, whose reduced prices and quantities can be determined optimally), responding to a competitor (e.g., by offering a highly limited number of low-cost or better quality-of-service offerings), or smoothing demand (e.g., by inducing higher usage at low-use times of day/week).

Using the management framework described above, it is straightforward to implement specialized objectives, which are valid at different times, based on market or resource conditions. These alternate objectives require no new tool or methodological development but only require re-running the mathematical model with specialized data inputs in each case. Below we discuss the three specialized objectives described above:

1. Increasing Market Share (e.g., Through Promotions, Whose Reduced Prices and Quantities can be Determined Optimally):

At times when it is desirable to offer special promotions to increase market share, it is possible to do so in an optimal manner using a yield management system of the invention. In particular, consider the following example:

New demand data can be obtained through marketing studies or interviews that a new set of users may be interested in using the computing center. In order to attract new clientele, one could announce special low cost promotions for a restricted time. Adding the new demand information (if available) to the model, and reducing substantially the minimum price (see subsection C above), and then rerunning the mathematical model, the output will contain a new set of optimal prices and quantities of each for each type of service-level. These will still be calculated to optimize the revenue based on the new promotion and lower introductory costs.

2. Responding to a Competitor (e.g., by Offering a Highly Limited Number of Low-Cost or Better Quality-of-Service Offerings):

Similarly to 1, above, if a competitor offers a promotion or new pricing structure, it is possible to respond quickly and optimally by lowering the minimum price level to the competitor's and recalculating the optimal offering structure (quantities to offer at each price and service-level). If new demand data can be obtained following the competitor's price change, then this should be added to the model as well.

3. Smoothing Demand (e.g., by Inducing Higher Usage at Low-Use Times of Day/Week):

A different objective is to smooth the demand level over time, or equivalently, smooth the usage level to reduce peak-time bursts. By offering promotions (described above) and price incentives, valid for low-use time of day or of the week, the usage patterns can be effectively smoothed across time. In order to determine the best way to achieve the goal of smoothing with the yield management tool of the invention, different scenarios can be tested and compared as this objective of smoothing usage patterns.

For example, consider that one wishes to define a new price-service offering policy which will shift some usage from Fridays to weekends and possibly add new customers for weekends, to make better use of idle capacity. By testing different minimum prices for weekend periods (all being lower than the present level), and higher minimum levels on Fridays, and by observing the predicted response (optimal quantities available at each price level at each time period), and the resulting revenue, one can make an informed decision about how to set promotional weekend prices to achieve the objective of smoothing demand by bringing more usage on the weekends. Similarly, one can offer, for the same price, higher quality levels (e.g., faster processing speeds) to achieve the same objective as with limited quantity low-price promotions for weekends and higher prices on Fridays.

Next, we present an exemplary implementation of the techniques described through a particular set of mathematical equations for an example application, and information on the algorithmic method for solving them. The model takes the form of a nonlinear optimization problem, with the following notation being used in this implementation. Consider:

- A set of heterogeneous computing resources, such as used in server farms, distributed computing, grids, application utilities, etc.
- A pool of nodes, or computing resources to allocate ($N_q$) and storage (S).
- Define a node class as q, which is characterized by processing speed, for servers, bandwidth, for networks, and other relevant parameters, for q=1 . . . Q.
- Define workload types, ($W_c$), and probabilities of arrival of each job type, ($\Gamma_c$), for c=1 . . . C.
- Define a goal: Expected value of the optimal allocation of $N_q$ and S at each decision epoch to maximize revenue by using highly segmented pricing and offering structures.
- In particular, determine the optimal number of "slots" ($n_{ikq}$, $S_i$) to offer for each service type, q, at each price ($r_{ikq}$ are the price levels for each of the "slots," and $p_{ik}$, the price levels for storage) at each time period, i, so as to optimize the goal.
- Obtain relevant data:
  - An estimation of the sojourn time of a unit job according to node type (T(q)).
  - A model of user preferences using demand curves or discrete choice models, e.g., logit choice probability functions, referred to as ($P_k$).
  - Set maximum number of price classes per service type, K.
  - Set planning period (number of individual time periods), I.

Solve:

$$\max_{n_{ikq}\geq 0, S_i\geq 0} E\left[\sum_{c=1}^{C}\sum_{i=1}^{I}\sum_{k=1}^{K} T_i(W_c, n_{ikq}, c)\left(\sum_{q=1}^{Q} r_{ikq}n_{ikq} + p_{ik}S_i\right)P_k(W_c, S_i)\Gamma_c\right]$$

$$\forall\, i, q$$

$$N_q - \sum_{k, z\leq i, z+T_i>i} n_{zkq} \geq 0,$$

$$\forall\, i$$

$$S - \sum_{k, z\leq i, z+T_i>i} S_z \geq 0,$$

To solve the above mathematical model, nonlinear programming solving routines may be used. In simple cases, in which preference functions, P, and sojourn times, T, are replaced by constants, linear programming solving routines may be used.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:

a computing center comprising one or more computer servers connected to a network, wherein the computing center provides on-demand utility services to clients in response to client requests for the utility services, the computing center comprising a plurality of computing resources residing on the one or more computer servers, the computing resources comprising hardware processor resources, disk storage resources, applications, and network resources;

a resource management platform executing on the one or more computer servers of the computing center, wherein the resource management platform comprises a resource management system, and a yield management system;

wherein the yield management system is configured to (i) determine current user demand for the utility services, (ii) predict future user demand for the utility services, (iii) determine current computing resource usage of the plurality of computing resources of the computing center, and (iv) predict future computing resource usage of the plurality of computing resources of the computing center;

wherein the yield management system generates priority information based on (i) the determined current user demand, (ii) the predicted future user demand, (iii) the determined current computing resource usage, and (iv) the predicted future computing resource usage, wherein the priority information specifies priorities to be assigned to one or more utility services requested by clients to meet service quality levels specified by associated service level agreements; and wherein in response to a client request for a utility service, the resource management system utilizes the priority information generated by the yield management system to dynamically adjust a current provisioning and future provisioning of the plurality of computing resources of the computing center, to provide the requested utility service to the client in response to the client request, while meeting the service quality levels specified by the associated service level agreements;

wherein the yield management system comprises:

a yield management reservation system which utilizes (i) the determined current user demand, (ii) the predicted future user demand, (iii) the determined current computing resource usage, and (iv) the predicted future computing resource usage, to determine one or more optimized price/service-level combinations associated with providing the utility service;

a yield management scheduler which determines, as part of the priority information, one or more schedules for provisioning computing resources to provide the utility service in accordance with the one or more optimized price/service level combinations.

2. The system of claim 1, wherein the yield management system further comprises:

a yield management monitor which tracks one or more service level agreements and a degree of satisfaction of the service quality levels specified by the one or more service level agreements, and which utilizes (i) the determined current user demand, (ii) the predicted future user demand, (iii) the determined current computing resource usage, and (iv) the predicted future computing resource usage, to compile aggregate statistics on a transaction level for use by the yield management reservation system to determine the one or more optimized price/service-level combinations.

3. The system of claim 2, wherein the yield management reservation utilizes the aggregate statistics to determine the one or more optimized price/service-level combinations by an automated process which comprises:

automatically determining a first quantity of computing resources to meet a given service quality level of the utility service to be provided at a first price; and automatically determining a second quantity of computing resources to meet the given service quality level of the utility service to be provided at a second price; and wherein the resource management system is configured to automatically allocate computing resources that are to be utilized to provide the utility service at the first quantity of computing resources or at the second quantity of computing resources, as selected in response to the client request, to meet the given service quality level.

4. The system of claim 2, wherein the yield management system further comprises a service level agreement advisor which adds one or more client-specific service requirements to the scheduling of a workload of a given client on a virtual cluster allocated to the given client.

5. The system of claim 3, wherein the yield management reservation system is further configured to offer more than one price for the same service level, where prices are offered in limited quantities, and the quantities are optimized depending on resource levels and demand models.

6. The system of claim 3, wherein the yield management reservation system is configured to recommend varying the quantities to be made available at each price and service level over a given period of time so as to effect usage patterns.

7. A method, comprising:

providing by a computing center, on-demand utility services to clients in response to client requests for the utility services, wherein the computing center comprises one or more computer servers connected to a network, and a plurality of computing resources residing on the one or more computer servers, the computing resources comprising hardware processor resources, disk storage resources, applications, and network resources;

running a yield management system of the computing center, to (i) determine current user demand for the utility services, (ii) predict future user demand for the utility services, (iii) determine current computing resource usage of the plurality of computing resources of the computing center, and (iv) predict future computing resource usage of the plurality of computing resources of the computing center;

generating by the yield management system, priority information based on (i) determined current user demand, (ii) the predicted future user demand, (iii) the determined current computing resource usage, and (iv) the predicted future computing resource usage, wherein the priority information specifies priorities to be assigned to one or more utility services requested by clients to meet service quality levels specified by associated service level agreements;

responsive to a client request for a utility service of the computing center, a resource management system utilizing the priority information generated by the yield management system to dynamically adjust a current provisioning and future provisioning of the plurality of computing resources of the computing center, to provide the requested utility service to the client in response to the client request, while meeting the service quality levels specified by the associated service level agreements;

utilizing, by the yield management system, (i) the determined current user demand, (ii) the predicted future user demand, (iii) the determined current computing resource usage, and (iv) the predicted future computing resource usage, to determine one or more optimized price/service-level combinations associated with providing the utility service; and determining, by the yield management system, as part of the priority information, one or more schedules for provisioning computing resources to provide the utility service in accordance with the one or more optimized price/service-level combinations.

8. The method of claim 7, further comprising:

tracking, by the yield management system, one or more service level agreements and a degree of satisfaction of the service quality levels specified by the one or more service level agreements;

utilizing, by the yield management system, said acquired information to compile aggregate statistics on a transaction level; and utilizing, by the yield management system, the aggregate statistics to determine the one or more optimized price/service-level combinations.

9. The method of claim 8, wherein utilizing the aggregate statistics to determine the one or more optimized price/service-level combinations comprises:

automatically determining a first quantity of computing resources to meet a given service quality level of the utility service to be provided at a first price; and automatically determining a second quantity of computing resources to meet the given service quality level of the utility service to be provided at a second price; and automatically allocating, by the resource management system, computing resources that are to be utilized to provide the utility service at the first quantity of computing resources or at the second quantity of computing resources, as selected in response to the client request, to meet the given service quality level.

10. The method of claim 8, further comprising adding one or more client-specific service requirements to the scheduling of a workload of a given client on a virtual cluster allocated to the given client.

11. The method of claim 8, wherein determining one or more optimized price/service-level combinations associated with providing the utility service further comprises offering more than one price for the same service level, wherein prices are offered in limited quantities, and the quantities are optimized depending on one or more resource levels and one or more demand models.

12. The method of claim 8, wherein determining one or more optimized price/service-level combinations associated with providing the utility service further comprises recommending varying the quantities to be made available at each price and service level over a given period of time so as to effect one or more usage patterns.

13. An article of manufacture comprising a machine readable storage medium comprising one or more programs which, when executed, implement method steps comprising:

providing by a computing center, on-demand utility services to clients in response to client requests for the utility services, wherein the computing center comprises one or more computer servers connected to a network, and a plurality of computing resources residing on the one or more computer servers, the computing resources comprising hardware processor resources, disk storage resources, applications, and network resources;

running a yield management system of the computing center, to (i) determine current user demand for the utility services, (ii) predict future user demand for the utility services, (iii) determine current computing resource usage of the plurality of computing resources of the computing center, and (iv) predict future computing resource usage of the plurality of computing resources of the computing center;

generating by the yield management system, priority information based on the determined current user demand, (ii) the predicted future user demand, (iii) the determined current computing resource usage, and (iv) the predicted future computing resource usage, wherein the priority information specifies priorities to be assigned to one or more utility services requested by clients to meet service quality levels specified by associated service level agreements;

responsive to a client request for a utility service of the computing center, a resource management system utilizing the priority information generated by the yield management system to dynamically adjust a current provisioning and future provisioning of the plurality of computing resources of the computing center, to provide the requested utility service to the client in response to the client request, while meeting the service quality levels specified by the associated service level agreements;

utilizing, by the yield management system, (i) the determined current user demand, (ii) the predicted future user demand, (iii) the determined current computing resource usage, and (iv) the predicted future computing resource usage, to determine one or more optimized price/service-level combinations associated with providing the utility service; and determining, by the yield management system, as part of the priority information, one or more schedules for provisioning computing resources to provide the utility service in accordance with the one or more optimized price/service-level combinations.

14. The article of manufacture of claim 13, wherein the method steps further comprise:

tracking, by the yield management system, one or more service level agreements and a degree of satisfaction of the service quality levels specified by the one or more service level agreements;

utilizing, by the yield management system, said acquired information to compile aggregate statistics on a transaction level; and utilizing, by the yield management system, the aggregate statistics to determine the one or more optimized price/service-level combinations.

15. The article of manufacture of claim 14, wherein utilizing the aggregate statistics to determine the one or more optimized price/service-level combinations comprises:

automatically determining a first quantity of computing resources to meet a given service quality level of the utility service to be provided at a first price; and automatically determining a second quantity of computing resources to meet the given service quality level of the utility service to be provided at a second price; and automatically allocating, by the resource management system, computing resources that are to be utilized to provide the utility service at the first quantity of computing resources or at the second quantity of computing resources, as selected in response to the client request, to meet the given service quality level.

16. The article of manufacture of claim 14, further comprising a method step of adding one or more client-specific service requirements to the scheduling of a workload of a given client on a virtual cluster allocated to the given client.

17. The article of manufacture of claim 14, wherein determining one or more optimized price/service-level combinations associated with providing the utility service further comprises offering more than one price for the same service level, wherein prices are offered in limited quantities, and the quantities are optimized depending on one or more resource levels and one or more demand models.

18. The article of manufacture of claim 14, wherein determining one or more optimized price/service-level combinations associated with providing the utility service further comprises recommending varying the quantities to be made available at each price and service level over a given period to effect one or more usage patterns.

* * * * *